United States Patent [19]
Damm et al.

[11] Patent Number: 5,462,395
[45] Date of Patent: Oct. 31, 1995

[54] SOUND DECOUPLING CONNECTING ELEMENT

[75] Inventors: Klaus Damm, Homberg/Ohm; Walter J. Mages, Alsfeld; Wolfgang Sommer, Gemünden, all of Germany

[73] Assignee: Kamax-Werke Rudolf Kellerman GmbH & Co. KG, Osterode, Germany

[21] Appl. No.: 199,461

[22] Filed: Feb. 22, 1994

[30] Foreign Application Priority Data

Mar. 27, 1993 [DE] Germany .................. 43 10 002.3

[51] Int. Cl.⁶ .................................... F16B 39/00
[52] U.S. Cl. .................. 411/107; 411/353; 411/999
[58] Field of Search .................. 411/353, 999, 411/107, 103, 368, 533, 424

[56] References Cited

U.S. PATENT DOCUMENTS

| | | | |
|---|---|---|---|
| 2,761,484 | 9/1956 | Sternick et al. | 411/353 |
| 2,919,736 | 1/1960 | Kann | 411/353 |
| 2,922,456 | 1/1960 | Kann | 411/353 |
| 3,746,067 | 7/1973 | Gulistan | 411/999 X |
| 4,732,519 | 3/1988 | Wagner | 411/999 X |
| 4,784,396 | 11/1988 | Scott et al. | 277/235 |
| 4,884,723 | 12/1989 | Dugge | 222/542 |
| 4,934,888 | 6/1990 | Corsmeier et al. | 411/353 |
| 4,975,008 | 12/1990 | Wagner | 411/533 X |
| 5,094,579 | 3/1992 | Johnson | 411/107 |
| 5,290,132 | 3/1994 | Gnage et al. | 411/107 X |

FOREIGN PATENT DOCUMENTS

| | | |
|---|---|---|
| 0272642 | 12/1987 | European Pat. Off. |
| 89/00335 | 2/1989 | European Pat. Off. |
| 0389783 | 2/1990 | European Pat. Off. |
| 2056793 | 7/1980 | United Kingdom |

Primary Examiner—Peter M. Cuomo
Assistant Examiner—Jerry Redman
Attorney, Agent, or Firm—Hopkins & Thomas

[57] ABSTRACT

A sound decoupling connecting element (1) for two parts (27, 28) with a gasket (29) inserted inbetween has a screw (2) with a head (4) and a shaft (8) with a threaded section (10, 11) and a radially extending support area (14) resting on a counter surface in the end-mounted position. The connecting element (1) has a sound decoupling sleeve-like formed body 3 made of an elastomer material. The formed body (3) has limited axial movement on the screw (2) in the mounted state of the connecting element (1), but is held in an unlosable fashion. The formed body (3) has such an axial length that it protrudes the first part (27) with a continuation (19) in the direction of the gasket (29) in the state of being inserted in the first part (27). The continuation (19) of the formed body (3) has a recess (20) for taking up in an unlosable fashion the gasket (29). At least one friction area pairing (22), which holds and aligns the screw (2) in every position over the lift (26) of the limited axial movement, is provided between the formed body (3) and the screw (2).

7 Claims, 5 Drawing Sheets 5,462,395

SOUND DECOUPLING CONNECTING ELEMENT

FIELD OF THE INVENTION

The invention relates to a sound decoupling connecting element for two parts with a gasket inserted inbetween, especially for the fastening of a cylinder head cover to a cylinder head, with a screw having a head or a center collar, which has a noncircular surface for the fitting of a spanner, a shaft with a threaded section, and a support area which extends radially and rests upon a counter area, especially on the cylinder head, in the end-mounted position, and with a sound insulating sleeve-like formed body made of an elastomer material, where the formed body is held to the screw in the premounted state of the connecting element preferably by a stop and a counterstop with limited axial movement, but so that it cannot be lost. The connecting element is used especially in the automotive production, e.g. between the cylinder head cover and the cylinder head, between a motorblock and the corresponding lower crankcase etc. It may be used anywhere, though, where two parts have to be connected to each other with a gasket inserted inbetween.

BACKGROUND OF THE INVENTION

A sound decoupling connecting element of the type described above is known from the U.S. Pat. No. 5,094,579. The connecting element serves to connect two parts with a gasket inserted inbetween. The connecting element itself has a screw, a washer, and a formed body of elastomer material, especially rubber; the connecting element therefore consists of three parts. The formed body of the connecting element has a central opening and a flange, which comes to rest on the outer surface of one of the two parts to be connected. The formed body has a continuation, with which it extends into an opening in one of the two parts to be connected. It has on its outer circumference a recess, with which it can be snapped into the step of a stepped bore hole in the first part. The free end of the continuation then lies between the two surfaces of the first of the two parts to be connected. The formed body has an opening in its center, through which the screw passes. Approximately in the intermediate region between the threaded part of the shaft of the screw and the threadless part of the shaft of the screw a radially outwardly extending collar is provided, the outer diameter of which is designed so that it passes through the opening in the formed body with a certain amount of clearance. At the end of the formed body, at which the washer rests, that is located at the head of the screw the formed body has a stop, which works together with the collar of the screw acting as a counterstop in such a way that the screw has limited axial movement relative to the formed body and all three parts are kept together as a premounted unit, so that the screw is held in an unlosable way at the formed body. The conecting element consisting of screw, washer and formed body can therefore be delivered premounted and as one unit. It is then merely necessary to clip the formed body of the unit into the step-like opening of the first part and finally to tighten the screw. As a premounted unit as well as in the position attached to the first part the screw is held to the formed body unlosably but only loosely, so that the screw has an undefined position with respect to the formed body. This is especially the case with overhead or slanted mounting positions. The screw can tilt with its axis within the formed body and relocate itself depending on its relative position to the axis of gravity. When screwing the screw into the thread, which is located in the second of the two parts to be connected, the screw penetrates a gasket with its tip and the threaded shaft. This not only has the disadvantage that components of the gasket can enter the thread and hinder or prevent the further screwing-in process; it is even more disadvantageous that in the course of this the middle collar on the shaft of the screw settles on the penetrated gasket and compresses this. The result of this is a nonreproducible and undefined end-mounted position, in which the screw holds the two parts to be connected more or less together and also compressses the formed body. During this compression the stop on the formed body, which sets the lift of the limited axial movement of the screw relative to the formed body, comes to rest on the shaft of the screw, so that a seal is achieved here, which makes it possible to use the screw in an area enclosed by the gasket. On the other hand there is the possibility that the collar provided in the middle region of the shaft of the screw supports itself on the surface of the second of the two parts to be connected. For this the gasket would have to be provided with an opening corresponding to the outer diameter of the collar, though. In this embodiment a reproducible end-mounted position is attained, in which on the one hand a reproducible prestress can be applied on the screw by the dimensioning of the different parts and on the other hand the formed body is reproducibly compressed and therefore clamps together the two parts. In both embodiments there is no possibility to create a premounted unit in which one of the two parts to be connected, the different connecting elements used, and the gasket form a premounted unit. Such a premounted unit including the gasket could only be created by further developing the gasket and providing it with an opening for the screw of each connecting element, the diameter of which is dimensioned so that it can engage in a turned groove between the collar and the threaded shaft of the screw. Further developing the object of the U.S. Pat. No. 5,094,579 in this direction results in two disadvantages: For one thing the limited axial movement of the screw relative to the formed body is lost, and for the other thing reproducible end-mounted positions cannot be obtained. Apart from this the connection with the gasket would be lost when the connecting elements are loosened.

A connecting element premountable to one unit from three parts, which does not furnish a sound decoupling effect, though, is known from the EP 0 272 642 A2. The connecting element is comprised of a head screw, a sleeve with a collar, and a formed body made of elastomer material. Between the sleeve and the screw stops and counterstops are formed here also, with the aid of which the screw is arranged unlosable and with limited axial movement. The sleeve is inserted into an opening of the formed body. This can be done with an anchoring in one of the two parts to be connected with each other. A gasket between the two parts to be connected to each other is not provided, so that the two parts are directly fastened to each other with their facing surfaces. In the process of this the sleeve can rest and support itself on the surface of the second of the two parts to be connected, so that through this sleeve a reproducible compression of the formed body is attained. The stops on the screw are formed by protruding cams, over which a stricture of the collar of the sleeve can snap when the two parts are connected. Here, too, the lift of the limited movement is set by stop and counterstop. Apart from this the screw can be tilted relative to the sleeve according to the given clearance, so that it is not guided with respect to the counterthread in the second of the two parts to be connected. An overhead mounting is also made difficult insofar as the screw, when let go of, will move the distance allowed by the limited lift in the direction dictated by gravity. The collar on the sleeve extends in a radial direction in such a way that its outer diameter is flush with the outer diameter of the formed body, while the head of the screw carries a normally dimensioned head bearing area. By way of the collar of the sleeve the compressing force of the screw is then transferred to the formed body. The creation of a connecting element from three parts represents here, too, a corresponding expenditure.

SUMMARY OF THE INVENTION

It is the object of the invention to provide a sound decoupling connecting element of the type described above, which is comprised of as few parts as possible, which allows a premounting on one or both of the parts to be connected to each other with the inclusion of a gasket, and which makes a simplified assembly and disassembly to or from the other part possible.

According to the invention this is achieved with the connecting element of the type described above by the formed body having such an axial length that it protrudes the first part in the direction of the gasket with a continuation provided thereon in the state in which it is mounted in the first part, that the continuation of the formed body has a recess for mounting the gasket so that it cannot be lost, and that at least one friction area pairing is provided between the formed body and the screw, which holds and aligns the screw in every position by the lift of the limited axial movement.

The invention makes it possible to hold the gasket to the formed body, as soon as the formed body is inserted into the first of the two parts to be connected. This in turn makes it possible to hold the gasket regardless of the state of the screw of being screwed in or out. The screws of the connecting elements can easily be tightened all at the same time by a multiple spanner during the first mounting, as is common in automotive factories. There is also the further advantage that, for example, repair shop one screw after the other may be loosened, without the gasket being lost from one of the two parts to be connected. The gasket remains unharmed and protected on one of the two parts and can therefore be reused. When assembling the premounted unit from the connecting elements, the first part, and the gasket, the gasket may be clipped into a recess provided on the continuation of the formed body. To this end the gasket has accordingly dimensioned and arranged openings.

The assembly of the premounted unit and the mounting and demounting is greatly simplified by at least one friction area pairing, which provides friction throughout the lift of the limited axial movement. The friction area pairing fulfills two functions: For one thing it ensures that the screw can be brought or pushed into any intermediate position of its limited axial lift relative to the formed body and that it keeps this position after being let go of. Secondly the friction area pairing has in every position an aligning action regarding the axis of the screw, so that it cannot slant in an undefined way anymore but is aligned, even if being aligned limitedly compliant relative to the axis of the counterthread in the second of the parts to be connected due to the elastomer material of the formed body, provided that the parts are machined to the specifications. It is possible, for instance, to pull the screw on each connecting element out of each formed body according to the limited axial movement, so that the free ends of the threaded shaft of each screw move past the free end of the continuation of each formed body or at least relative to the bearing area of the gasket on the second part; the premounted first part can be put onto the second part in this state, without the danger of the especially ground surface of the second part being harmed by the screws. Each screw is held aligned with its axis already in this position. After this positioning of the premounted first part with the gasket it is then possible to further insert the screws of the connecting elements axially into the respective formed body. During this, too, the aligning action is conserved, and the free ends of the threaded sections of the screws are inserted easier into the respective counterthread in the second of the parts to be connected. A mounting by robots is possible, with the further inserting and the screwing-in of the screws being done by a multiple spanner in a single work step.

With the new connecting element a reproducible endmounted position is also obtained, because a radial support area is formed in the middle region of the shaft of the screw, which is supported on the countersurface that is formed by the surface of the second of the two parts to be connected to each other. With this a reproducible compression of the formed body is obtained at the same time. The two parts to be connected to each other are tightened reproducibly and still held to each other in a sound decoupling fashion.

The new connecting element has the further advantage that it is comprised of only two individual parts. Furthermore, it can be dismantled into its components at any time, so that defective parts can be replaced without inevitably destroying other components.

The new connecting element also has considerable advantages during overhead or slanted mounting, e.g. on a V-engine. The screw is guided in each connecting element by the formed body independent of the direction of action of gravity, so that the screw finds the counterthread in the second of the two parts to be connected much easier than in the state of the art. There is also no danger of the screws tipping in the formed body or changing their position by themselves. On the other hand the aligned guiding element in the formed body made of an elastomer material compliant to a corresponding degree, so that tolerances can be compensated and the screw still finds its counterthread—even with robot mounting—in the second part.

The friction area pairing should have a certain axial extension, i.e. a certian axial length over which the screw and the formed body are guided along each other during the lift of the limited axial movement, for the compliant alignment of the axis of the screw and for holding it in every position. In connection with the surface quality of the friction area pairing this axial extension at the same time determines the friction, which is dimensioned so that it holds the screw in any intermediate position and so that at least the force of gravity cannot lead to a self-acting change of this position. The friction may of course be chosen to be somewhat higher, e.g. to ensure that the forces occurring during a transport or a conveyance of the premounted units do not lead to a displacement of the screw relative to the formed body.

The friction area pairing is always provided between the screw and the formed body, without the insertion of any further parts. Depending on the geometric formation and arrangement the friction area pairing may be arranged in different positions, though, which mainly differ—depending on the application—in the distance of the friction area pairing to the plane of the gasket.

It is also possible to provide a second friction area pairing between the formed body and the screw, which is provided in addition to the first friction area pairing. This results in the possibility to shorten the axial length of each friction area pairing and as it were to distribute this length onto two friction area pairings. It is then useful that the two friction area pairings are seperated by a certain distance. In this case an even better and more exact alignment of the axis of the screw relative to the axis of the formed body results in each position of the total lift of the limited axial movement. The two friction area pairings may also be formed and arranged so that they come into effect one after the other upon the insertion of the screw into the formed body, so that the mechanic can distinguish by feeling two friction values, in order to sense how far the screw is moved or inserted in the formed body.

The screw may have an upset swelling, which on the one hand is a part of the friction area pairing and which on the other hand forms the support area for the reproducible end-mounted position, approximately in the middle region of the shaft. The swelling has two functions. On the one hand it forms the support area, which rests on a counter-area, especially on the cylinder head, in the end-mounted position. On the other hand the swelling cooperates with the axial surface regions of the opening in the formed body in the sense of forming one or the other friction area pairing. Stop and counterstop for the unlosable arrangement of the screw in the formed body may additionally be provided. It is also possible, though,—in all of the embodiments—to do without the stop and counterstop and instead to use the friction of a friction area pairing to hold the screw on the formed body unlosably; of course the screw can be removed from the formed body when it is retracted so far that there is no more contact with the surfaces of the friction area pairing.

Instead of a swelling that extends in its diameter over the threadless part of the shaft of the screw the screw may have a shoulder forming a step, which forms the support area, approximately in the middle region of its shaft. A simple discontinuity in the diameter suffices, which of course has to be formed and arranged so that the shaftless part of the shaft of the screw has a larger diameter than the threaded part of the shaft.

The lift of the limited axial movement between the screw and the formed body may be formed to be larger than the screw-in length of the screw, so that the free end of the screw can be retracted within the lift of the limited axial movement and without cancelling the unlosability. The free end of the screw is then set back at least with respect to the plane of bearing of the gasket on the second part.

The recess provided on the formed body to form a premounted unit including the connecting element, the first part, and the gasket may be a surrounding groove radially open towards the outside on the outer perimeter on the continuation, into which the gasket, preferably by a metal ring integrated therein, can be inserted. The insertion is done in a sort of clip-in process, during which the free end of the continuation of the formed body is elastically deformed. It is also possible to push forward the screws on this premounted unit, making use of the lift of the limited axial movement, so far that they protrude relative to the plane of the gasket with their free ends. The free ends can then be mated to the counterthreads in the second part much easier.

In the different embodiments the head or the center collar of the screw may have an enlarged outer diameter as compared to the diameter of the shaft and therefore an enlarged bearing area for the compression of the formed body. While usually certain shaft or thread diameters have correspondingly dimensioned head widths assigned to them, the head to the center collar is provided with an enlarged outer diameter here, so that the bearing area at the formed body is enlarged by this and the insertion of a washer or the like can be avoided.

The friction area pairing or the friction area pairings may have a coating, which is provided on the inner circumference of the formed body and/or on the outer circumference of the shaft of the screw. This coating serves to set the friction of the friction area pairing to a defined value. In this way a safeguard against a loosening on its own can be provided or the friction provided by the friction area pairing can be fixed in its value. Instead of the provision with a coating or additionally to this the surfaces coming into contact with each other may be finished or formed differently, i.e. be provided with corresponding roughnesses.

A turned groove may be provided between the part of the shaft having the thread and the threadless part of the shaft of the screw. Such a turned groove makes the bevelling of the entrance of the thread in the second of the parts to be connected superfluous.

BRIEF DESCRIPTION OF THE DRAWINGS

The invention is further described and explained with the aid of the preferred embodiments. The Figures show.

DETAILED DESCRIPTION

Figure 1:
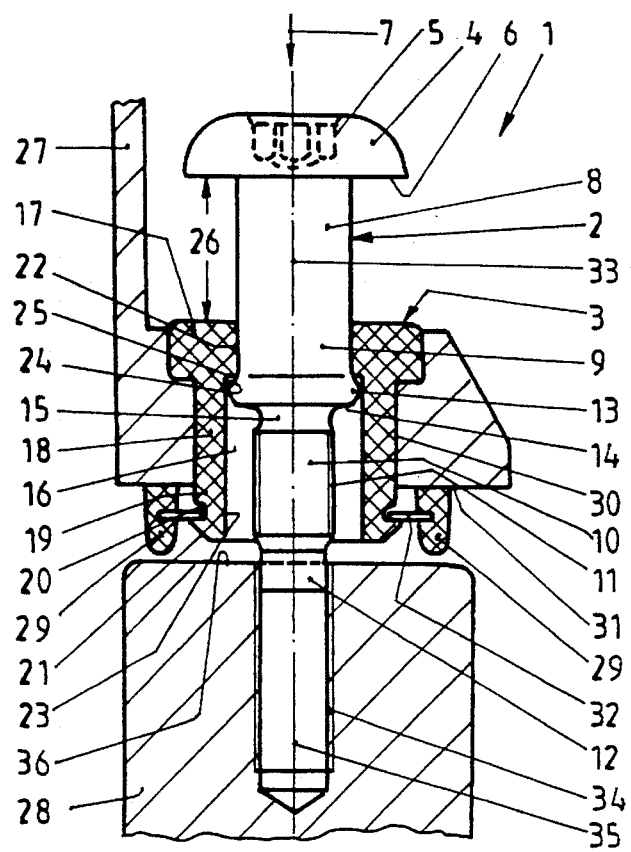
FIG. 1 is a cut through a first embodiment of the connecting element with the parts in relative positions before the tightening of the screw.
Figure 2:
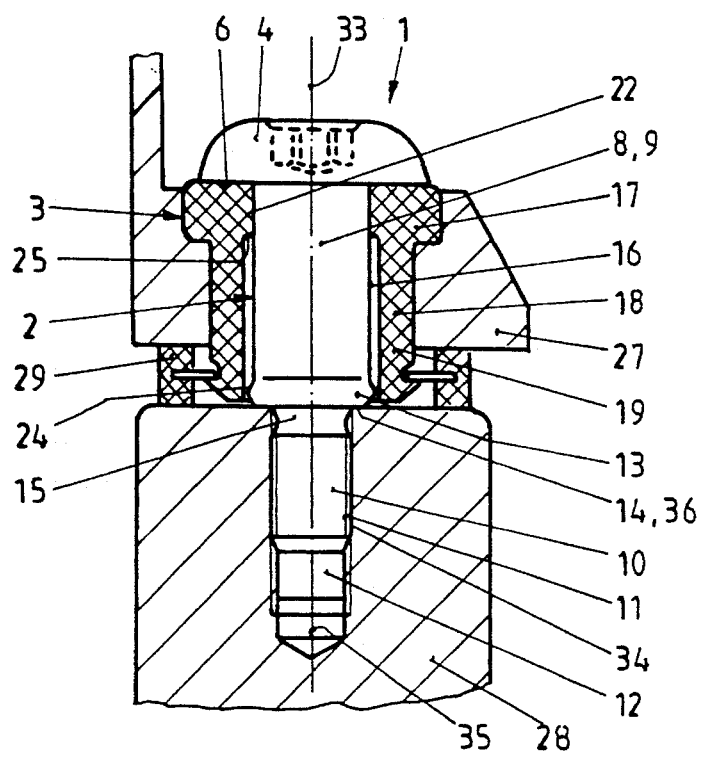
FIG. 2 is a cut through the connecting element according to FIG. 1 after tightening the screw.

The FIGS. 1 and 2 show a connecting element 1 which consists of two parts, a screw 2 made of metal and a formed body 3 made of an elastomer material, especially rubber.

The screw 2 has a head 4, which is provided with a noncircular surface 5 for the application of a spanner. The noncircular surface 5 is fashioned as a hexagon socket in this case. The head 4 is relatively broad, i.e. it has a relatively large diameter, so that a correspondingly large bearing area 6 is formed on its bottom, which comes into an effective contact with the formed body 3. Attached to the head 4 in the screw-in direction according to the arrow 7 the screw 2 has a shaft 8, which has a first part 9, which is formed as a smooth part without a thread and having a constant breadth, facing the head 4. The shaft 8 has a second part 10, which is provided with an outer thread 11. The shaft 8 merges into a front free end 12, which may be fashioned to be cylindrical, formed without a thread, and which may have a diameter that is smaller or at most equal to the core diameter of the outer thread 11. An upset swelling 13, which protrudes radially from the otherwise smooth diameter of the part 9 and which forms a support area or shoulder 14 in an axial direction, is provided on the threadless part 9 of the shaft 8. A turned groove 15 is connected to this at the junction to the part 10 with the outer thread 11.

The formed body 3 is provided as a hollow formed body with a central or internal opening 16 having a constant breadth, through which the screw 2 extends. The formed body 3 has a flange 17, a sleeve-like center piece 18, and a continuation 19, which is provided with a recess 20 on its outer side in the region of its free end. The recess 20 is formed to be a radially open groove. The continuation 19 is provided with a conical slope 21.

A friction area pairing 22, which has a certain axial extension or sliding engagement in the direction of the arrow 7, is provided or formed between the cylindrical part 9 of the shaft 8 of the screw 2 and the inner diameter of the flange 17 of the formed body 3. For the formation of the friction area pairing 22 the surfaces of the screw 2 and the formed body 3 coming into contact are accordingly dimensioned and formed. In connection to the friction area pairing 22 the opening 16 of the formed body 3 merges in the direction of the arrow 7 into an enlarging diameter section 23. The diameter section 23 is dimensioned relative to the outer diameter of the swelling 13 so that clearance may be provided here and that the screw 2 and the formed body 3 do not come into contact in this region. The swelling 13 furthermore forms a stop 24, while the step in the opening 16 forms the corresponding counterstop 25. As can be seen, the connecting element 1 can be assembled as a premounted unit by inserting the screw 2 into the formed body 3 as shown in FIG. 1. The screw 2 is then held in the formed body 3 in an unlosable way by the friction area pairing 22 and by stop 24 and counterstop 25. The friction area pairing 22 is dimensioned so that the screw 2 is held in the formed body 3 in every inserted position. As can be seen, the screw 2 is borne in the formed body 3 in the inserted state with limited axial movement. The possible lift 26 of the limited axial movement is determined by the distance of the bearing area 6 of the head 4 from the surface of the flange 17 of the formed body 3. As seen relative to the formed body 3 the lift 26 is determined by the stop 24 and the counterstop 25 on the one side and by the bearing area 6 on the other side.

The connecting element 1 serves to connect a first part 27 with a second part 28 with a gasket 29 inserted inbetween. This is a typical application situation in the automotive industry. For instance, the second part 28 may be a cylinder head having a threaded bore hole. The first part 27 is formed by a cylinder head cover having a bore hole. The gasket 29 is the gasket usually provided between these two parts.

It can be seen that the continuation 19 of the formed body 3 is dimensioned so that it protrudes in the inserted state into an e.g. stepped bore hole 30 in the first part 27, extending past the surface 31 facing the second part 28, so that the recess 20 is located outside the first part 27. A metal ring 32 integrated in the gasket 29 can, after the formed body 3 has been inserted into the bore hole 30 of the part 27, be snapped over the slope 21 so that the metal ring 32 enters the recess 20. The gasket 29 is then held by the formed body 3 in an unlosable way. A premountable unit consisting of the connecting element 1, the first part 27, and the gasket 29 is thus created. In the premounted state of this unit finally consisting of four parts, that is the screw 2, the formed body 3, the first part 27, and the gasket 29, the limited axial movement of the screw 2 relative to the formed body 3 is not obstructed. The opposite is the case, that is the screw 2 can, as shown in FIG. 1, be brought opposite to the direction of the arrow 7 into an end position in which only the free end 12 of the shaft 8 protrudes with respect to the gasket 29. In this position (and in every other intermediate position) the axis 33 of the screw 2 is held aligned to the coinciding axis of the formed body 3. Then the free end 12 of the screw 2 is aligned in such a position that it finds with its axis 35 a counterthread 34 provided in the second part 28 easily when the premounted unit consisting of four parts is joined to the second part 28, so that this joining and the following tightening of the screw 2 can be performed by a robot. A multispindle spanner can also be used, in order to simultaneously tighten a number of such connecting elements 1, which are distributed at corresponding distances along the perimeter of the part 28 that is to be sealed. During this tightening process the gasket 29 comes to rest on the surface 36 of the part 28. The surface 36 at the same time forms a counter surface for the support area 14 of the swelling 13, so that the tightening process of the screw 2 is ended by the reproducible setting of the support area 14 on the surface 36, as shown in FIG. 2. The screw 2 is dimensioned so that the bearing area 6 of the head 4 at the same time comes to rest on the surface of the flange 17 of the formed body 3 and compresses the formed body 3. Insofar the first part 27 is therefore held to the part 28 in a sound decoupling fashion. The swelling 13 opposes the free end of the continuation 19 in this end-mounted position, as can be seen in FIG. 2, and prevents the metal ring 32 from slipping out of the recess 20.

The friction area pairing 22 is effective over the total lift 26, on the one hand to hold the screw 2 in every intermediate position, and on the other hand to keep the axis 33 of the screw 2 aligned in every intermediate position. From FIG. 2 it is conceivable that a loosening of the screw 2 by a corresponding force acting on the noncircular surface 5 in the sense of loosening is possible, which causes the screw 2 to move oppositely to the direction of the arrow 7. This does not cancel or impair the unlosable bearing of the gasket 29 in the formed body 3, though. The screw 2 is held by the shaped body 3 in an unlosable way even after being fully unscrewed. But it can also be fully removed from the shaped body 3, e.g. when the screw 2 and/or the formed body 3 are to be replaced. When the formed body 3 is to be replaced, it is understood that the gasket 29 has to be removed from it first.

The friction area pairing is formed so that it holds and presents aligned the screw 2 in any intermediate position of the lift 26 independant of the relative position of the axis 33 of the connection element with respect to the direction of action of gravity. This is especially useful with overhead or slanted mounting.

Figure 3:
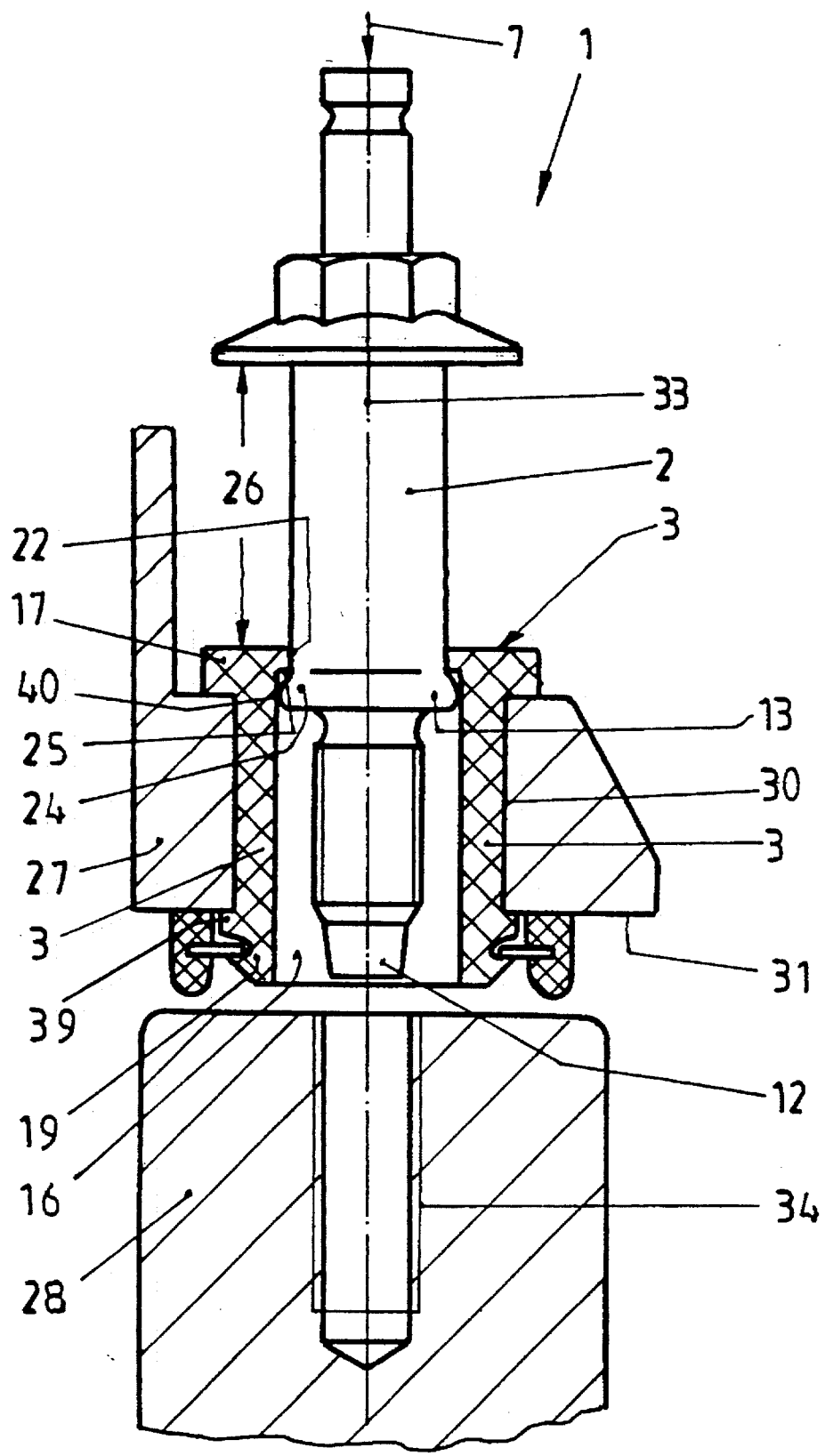
FIG. 3 is a cut through a second embodiment of the connecting element before the tightening of the screw.
Figure 4:
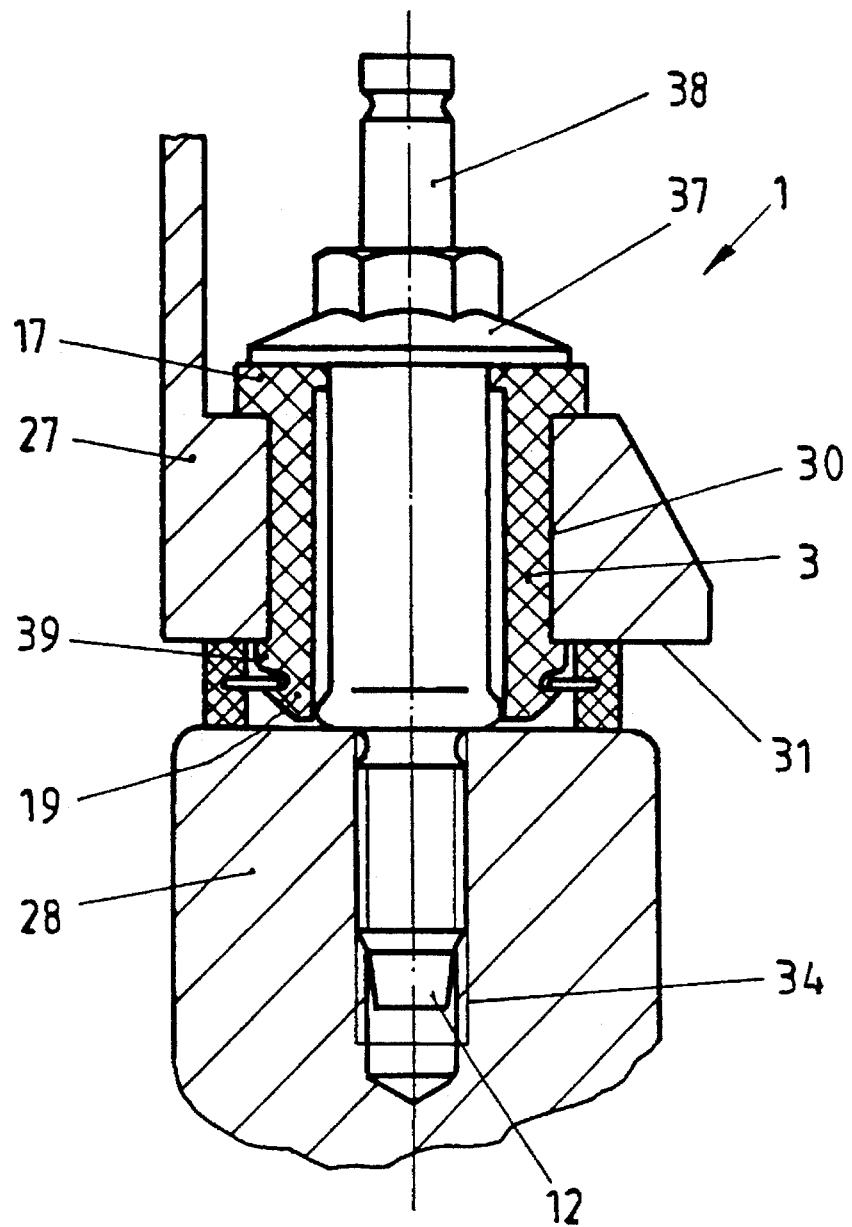
FIG. 4 is a cut through the connecting element according to FIG. 3 after the tightening of the screw.

The further embodiment of the connecting element shown in FIGS. 3 and 4 is largely equal to the embodiment of FIGS. 1 and 2, so that in the following only the differences are described. Instead of a head 4 the screw 2 has a center collar 37, which on its bottom forms the bearing area 6, but which otherwise merges opposite to the direction of the arrow 7 into a stud 38, which can be provided for different applications. For instance, this stud 38 allows the bearing of a holder for a cable or such.

The formed body 3 is inserted into a continuous bore hole 30 in the first part 27 so that its flange 17 remains outside of the bore hole 30. The continuation 19 protrudes past the surface 31 here too, though, and is held to the part 27 by a rib 39 radially extending towards the outside.

The friction area pairing 22 here has a diminished axial length as compared to the embodiment of the FIGS. 1 and 2. It is supplemented by a second friction area pairing 40. To this end the swelling 13 of the screw 2 extends radially further towards the outside, so that the clearance to the opening 16 or the diameter section 23 is done away with, and the screw 2 and the formed body 3 are in contact with each other also in the region of this second friction area pairing 40 along the full lift 26. The second friction area pairing 40, too, has a comparably short axial extension as the does the friction area pairing 22. The two friction area pairings 22 and 40 together fulfill the function of holding the screw 2 relative to the formed body 3 in every intermediate position of the lift 26. Furthermore, the two friction area pairings 22 and 40 enlarge the distance inbetween them when the screw 2 is pushed in relative to the formed body 3 in the direction of the arrow 7, so that the aligning effect on the axis 33 of the screw 2 is further enhanced.

The free end 12 of the screw 2 is tapered, so that tolerances during the insertion of the screw 2 are compensated for easier and a further aligning effect is used when finding the recess of the counterthread 34. The swelling 13 forms the stop 24 here, too, which in connection with the counterstop 25 on the one hand limits the lift 26 and on the other hand in conjunction with the two friction area pairings 22 and 40 guarantees the unlosability of the screw 2 inserted into the formed body 3.

Figure 5:
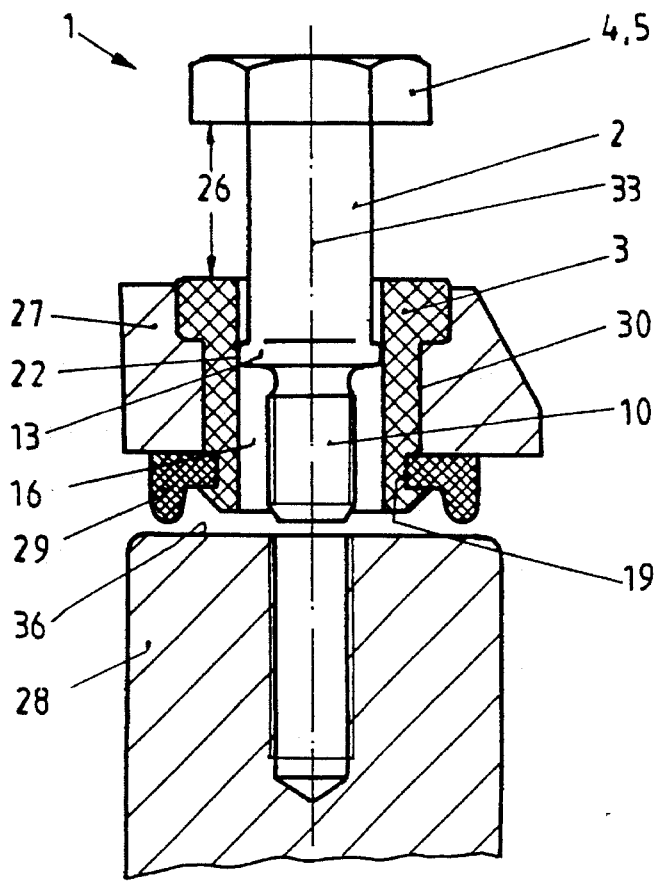
FIG. 5 is a cut through a further embodiment of the connecting element before the tightening of the screw.

In the embodiment of the FIG. 5, on the other hand, there is no stop 24 and counterstop 25. The swelling 13 is provided in the form of a cylindrical section on the shaft 8 in this case, and it cooperates with a non-stepped opening 16 in the formed body 3. The single friction area pairing 22 formed in this way fulfills three functions. It securely holds the screw 2 in every intermediate position. It fulfills the aligning effect for the axis 33 in any position, and it guarantees, as long as the friction is effective, the unlosability of the screw 2 from the formed body 3. Of course the screw 2 can also be fully removed from the formed body 3. This is also possible in the preceding embodiments by overcoming the stop 24 and the counterstop 25, though. The screw 2 ends freely with its part 10, which carries the outside thread. A bezel may be provided to facilitate the insertion. The gasket 29 has no integrated metal ring, but is clipped directly into the recess 20, which has an enlarged cross section. The head 4 of the screw 2 has a hexagonal shape for the noncircular surface 5.

The connecting element according to FIG. 5 may be handled in the same way as described for the previous embodiments. A first premounted unit consisting of the screw 2 and the formed body 3 can be formed. A second premounted unit can be formed consisting of the screw 2, the formed body 3, the part 27, and the gasket 29. The lift 26 may be dimensioned so that the front free end of the screw 2 recedes behind the front resting surface of the gasket 29 on the surface 36, so that the surface 36 is not damaged during a positionally inexact mounting process of the unit consisting of the four parts.

Figure 6:
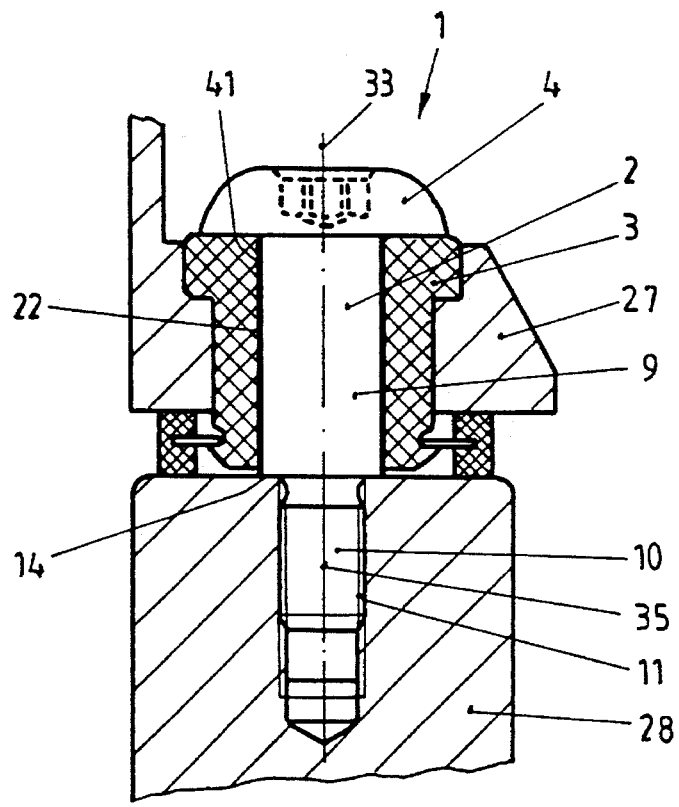
FIG. 6 is a cut through a further embodiment of the connecting element after the tightening of the screw.

The embodiment of the connecting element 1 according to FIG. 6 has a non-stepped continuous opening 16 in the region of the formed body, as has already been described for the embodiment of FIG. 5. Here only one friction area pairing 22 (or two immediately neighboring friction area pairings 22 and 40) is provided, though, which extends over the whole height of the contact areas. A radially extending swelling is not used here. The support area 14 is formed by a step at the transition of the wholly cylindrical part 9 to the part 10 of the shaft 8 that is provided with the outside thread 11. One or both of the surfaces that form the friction area pairing 22 can be fully or partially provided with a coating 41, which on the one hand increases the friction of the friction area pairing 22 and which on the other hand is to a degree a safeguard against an unwanted loosening of the tightened screw. In connection with this a tight fit of the formed body 3 in the first part 27 can be obtained through the compression of the formed body 3 in the tightened state, so that the coating 41 can be effective in the manner described above. This embodiment has the disadvantage that the friction of the friction area pairing 22 varies with the effective length of the contact areas over the lift 26 of the limited axial movement. This can be accepted, though, and through a corresponding geometrical formation it can be effected that the screw 2 is securely held to the formed body 3 even in a largely removed state and the unlosability is guaranteed. Instead of the coating 41 one or both of the contact areas may be provided with a corresponding roughness.

Figure 7:
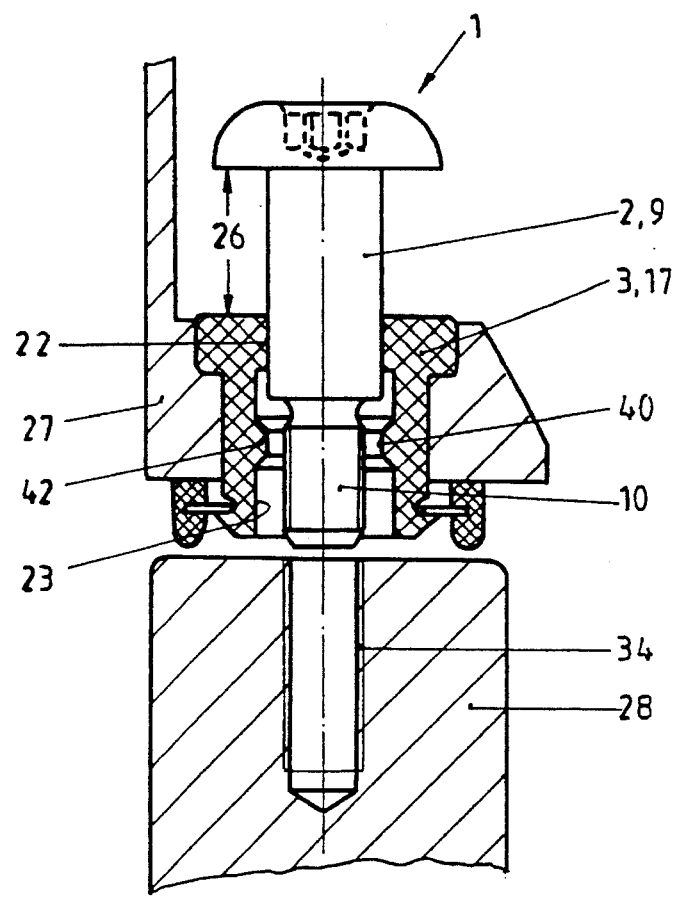
FIG. 7 is a cut through a further connecting element before the tightening of the screw.

The embodiment of the connecting element according to FIG. 7 is characterized in that the swelling 13 again is done without, and that the first friction area pairing 22 is effective between the screw 2 and the formed body 3 over the total lift 26 of the limited axial movement. The formed body 3 has in the region of the cylindrical section 23 a projection 42, the inner diameter of which corresponds to the inner diameter of the flange 17, so that a second friction area pairing 40 is formed and goes into effect only after a part of the lift 26 has been covered during the insertion process. The mutual distance between the two friction area pairings 22 and 40 remains constant during the insertion. The geometric formation can be such that the sudden step in friction by the second friction area pairing 40 coming into effect signals the user that the free end of the shaft 8 of the screw 2 is entering the recess of the counter thread 34, and therefore that the insertion of the screw 2 into the second part 28 has taken place under improved aligning conditions.

Figure 8:
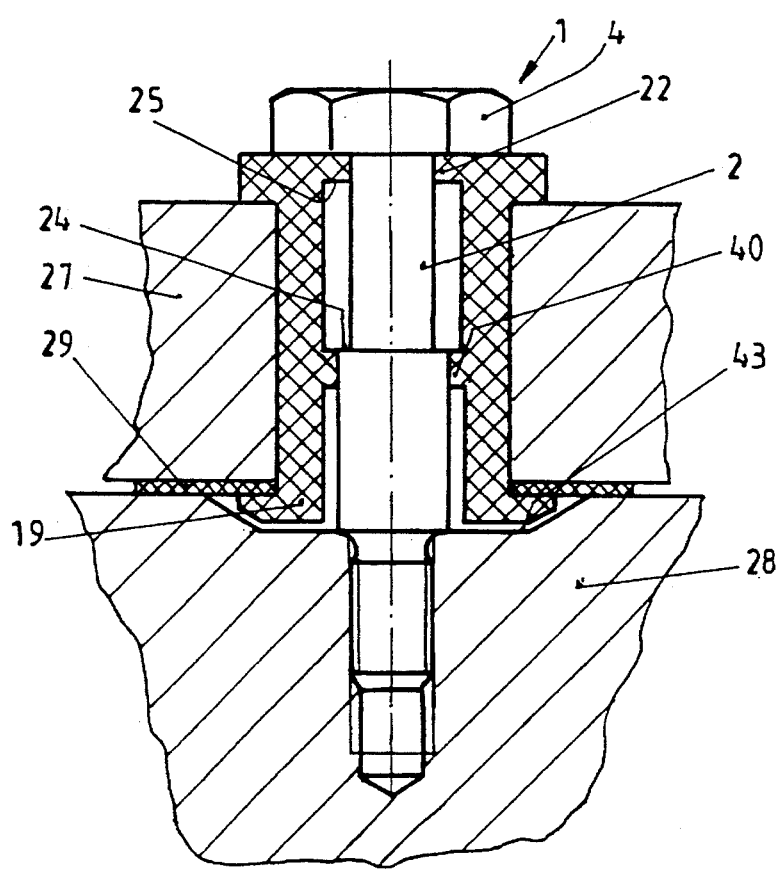
FIG. 8 is a cut through a further embodiment of the connecting element after the tightening of the screw.

The embodiment according to FIG. 8 is characterized in that the two friction area pairings 22 and 40 are effective during the whole insertion motion of the screw 2 into the formed body 3. To this end the part 9 of the shaft 8 is divided into two parts of approximately equal length, which are also set off against each other with respect to their diameter, as is shown in FIG. 8. The corresponding contact areas on the formed body 3, which form the first friction area pairing 22 and the second friction area pairing 40, are correspondingly formed and arranged. Here the stop 24 and the counterstop 25 are used again, in order to ensure the unlosability in this way. The gasket 29 is formed as a flat gasket here, and is taken up by the free end of the continuation 19 of the formed body 3. A corresponding hollow 43 is provided in the part 28, in which the protruding continuation 19 of the formed body 3 is accepted.

While the foregoing specification and drawings set forth preferred embodiments of the invention, it will be understood by those skilled in the art that variations and modifications thereof can be made without departing from the spirit and scope of the invention as described in the following claims.

We claim:

1. A sound insulating connecting element for connecting a first part having a bore hole and a second part having a threaded bore hole, with a gasket inserted between said first and second pares, said connecting element having a premounted position substantially retracted from the threaded bore hole of the second part and an end-mounted position inserted into the threaded bore hole of the second part, said connecting element comprising;

a screw having a shaft, an enlarged head at one end of said shaft, said shaft including a generally constant breadth portion adjacent said head, a threaded portion adjacent the distal end of said shaft, and a shoulder positioned between said constant breadth portion and said threaded portion and extending radially outwardly beyond said constant breadth portion and said threaded portion of said shaft for engagement with said second part when said element is in its end-mounted position;

a sound insulating sleeve-like formed body of an elastomer material for insertion into the bore hole of said first part, said formed body having a substantially constant breadth internal opening extending therethrough for receiving said screw, the breadth of said formed body internal opening matching the breadth of said shoulder for sliding engagement with said shoulder, said formed body further including a radially inwardly projecting flange positioned between said outwardly extending shoulder and said head of said screw and sized and shaped for limited longitudinal slidable engagement with said screw shaft between said shoulder and said head and forming a friction area pairing with said screw shaft, said formed body further including a continuation for projecting beyond said bore hole of the first part toward the second part, said continuation including a mounting means for mounting a gasket to said connecting element in a position between the first and second parts, whereby said screw can be moved through said insulating body from its premounted position toward its end-mounted position into threaded engagement with said second part as said outwardly extending shoulder of said screw and said inwardly extending flange of said formed body maintain the screw in alignment with the internal opening of said formed body and the gasket is maintained by said formed body between said first and second parts.

2. A connecting element according to claim 1, wherein a second friction area pairing is provided between said formed body and said screw shaft.

3. A connecting element according to claim 1, wherein the distance from said screw head to said formed body when the element is in the premounted position is longer than the length of the screw which extends from said formed body when the element is in the end-mounted position.

4. A connecting element according to claim 1, wherein the continuation comprises an outer perimeter and wherein said gasket mounting means comprises a radially open groove on said outer perimeter of said continuation, into which the gasket can be inserted, preferably by a metal ring integrated therein.

5. A connecting element according to claim 1, wherein said head of said screw has an enlarged outer diameter as compared to the diameter of the opening provided by said flange and therefore forms an enlarged bearing area for the compression of said formed body.

6. A connecting element according to claim 1, wherein either said formed body inwardly projecting flange or said screw shaft constant breadth portion is provided with a friction enhancing coating.

7. A connecting element according to claim 1, wherein a turned groove is provided on said screw shaft between said threaded portion and said shoulder.

* * * * *